United States Patent
Wen

(10) Patent No.: US 9,164,628 B2
(45) Date of Patent: Oct. 20, 2015

(54) SIGNAL PROCESSING METHOD FOR TOUCH PANEL AND TOUCH PANEL SYSTEM

(75) Inventor: Chao-Cheng Wen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 540 days.

(21) Appl. No.: 13/545,205

(22) Filed: Jul. 10, 2012

(65) Prior Publication Data

US 2013/0162588 A1 Jun. 27, 2013

(30) Foreign Application Priority Data

Dec. 26, 2011 (TW) .............................. 100148699 A

(51) Int. Cl.
  *G06F 3/045* (2006.01)
  *G06F 3/044* (2006.01)
(52) U.S. Cl.
  CPC ..................................... *G06F 3/044* (2013.01)
(58) Field of Classification Search
  CPC ...................................................... G06F 3/042
  USPC ................................................. 345/173–178
  See application file for complete search history.

(56) References Cited

U.S. PATENT DOCUMENTS

| | | | |
|---|---|---|---|
| 2011/0025649 A1* | 2/2011 | Sheikhzadeh Nadjar et al. | 345/177 |
| 2011/0260741 A1* | 10/2011 | Weaver et al. | 324/686 |
| 2012/0092296 A1* | 4/2012 | Yanase et al. | 345/174 |

FOREIGN PATENT DOCUMENTS

TW  I251782 B  3/2006

OTHER PUBLICATIONS

Taiwan Office Action dated May 12, 2014, 7 pages.

* cited by examiner

*Primary Examiner* — Dennis Joseph
*Assistant Examiner* — Chun-Nan Lin
(74) *Attorney, Agent, or Firm* — Edell, Shapiro & Finnan, LLC

(57) ABSTRACT

A signal processing method for a touch panel is provided. The touch panel includes several capacitor electrodes. The method includes the following steps. Detection values are provided according to self-capacitance changes of the capacitor electrodes. The detection values are then low-pass filtered by a filter structure to generate several filtered values. A position where a touch event occurs on the touch panel is determined according to the filtered values.

14 Claims, 6 Drawing Sheets

SIGNAL PROCESSING METHOD FOR TOUCH PANEL AND TOUCH PANEL SYSTEM

This application claims the benefit of Taiwan application Serial No. 100148699, filed Dec. 26, 2011, the subject matter of which is incorporated herein by reference.

BACKGROUND OF THE INVENTION

1. Field of the Invention

The invention relates in general to a signal processing method for a touch panel, and more particularly, to a signal processing method for preventing or alleviating disturbances caused by panel deformation.

2. Description of the Related Art

Touch panels are human-machine interfaces. By touching different positions with different gestures on a touch panel, one is allowed to enter a desired command easily to a machine, such as a computer, a cell phone and a camera. Current touch panels are generally categorized into resistive and capacitive types. A capacitive touch panel is more durable and power-saving, and thus prevails in portable products including tablet PCs and cell phones.

Lowering production costs has always been a dominant method for manufacturers to increase product competitiveness. Therefore, reducing production costs of capacitive touch panels is a goal of manufacturers. For example, a conventional capacitive touch panel needs at least two patterned conductive layers to construct a required capacitor electrode array. In considerations of cost and yield rate, a capacitive touch panel with merely a single conductive layer has been developed. However, the touch panel with a single conductive layer brings about many control issues. For example, finger presses cause panel deformations, which possibly lead to a capacitance change on capacitive electrodes on the single conductive layer, and further result in undesirably inaccuracy in touch position sensing.

SUMMARY OF THE INVENTION

According to one embodiment of the disclosure, a signal processing method for a touch panel is provided. The touch panel comprises a plurality of capacitive electrodes. The method comprises steps of: providing a plurality of detection values respectively corresponding to capacitive changes of the capacitor electrodes; low-pass filtering the detection values according to a filter structure to generate a plurality of filtered values; and determining a touch position where a touch event occurs on the touch panel according to the filtered values or the detection values. The filter structure is associated with a characteristic reflected by the touch event.

According to another embodiment of the disclosure, a touch panel system comprising a touch panel and a touch panel controller is provided. The touch panel comprises a plurality of capacitor electrodes. The touch panel controller, coupled to the capacitor electrodes, detects the capacitor electrodes to generate a plurality of corresponding digital detection values. The touch panel controller low-pass filters the detection values according to a filter structure to generate a plurality of filtered values. A touch position where a touch event occurs on the touch panel is determined according to the filtered values or the detection values. The filter structure is associated with a characteristic reflected by the touch event.

The above and other aspects of the invention will become better understood with regard to the following detailed description of the preferred but non-limiting embodiments.

The following description is made with reference to the accompanying drawings.

DETAILED DESCRIPTION OF THE INVENTION

Figure 1:
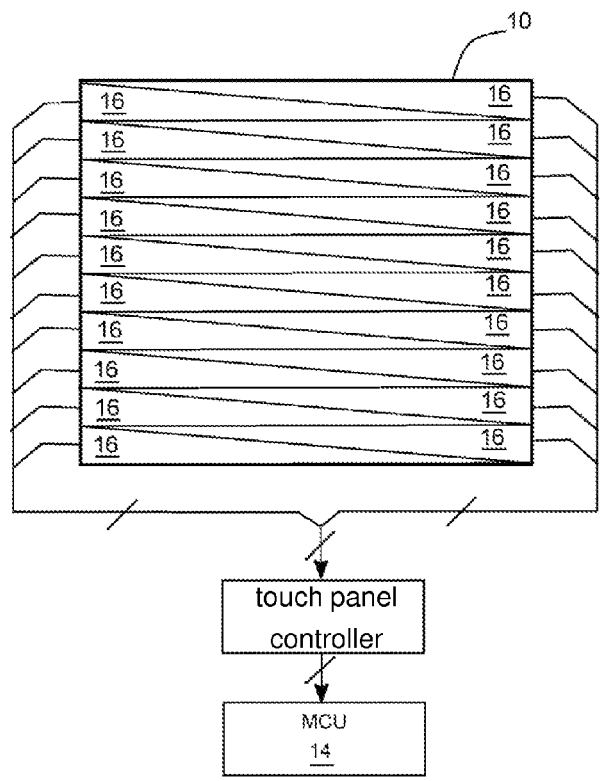
FIG. 1 is a touch panel system.

FIG. 1 shows a touch panel system comprising a touch panel 10, a touch panel controller 12, and a microprocessor 14. The touch panel 10 comprises a plurality of triangular to trapezoidal capacitor electrodes 16. The touch panel controller 12 is connected to the capacitor electrodes 16 via wires. When a conductive object or a human hand touches or approaches the capacitor electrodes 16, self-capacitances of the capacitor electrodes 16 changes. Through the wires, the touch panel controller 12 detects the self-capacitance changes of the capacitor electrodes 16, and accordingly determines the occurrence of a touch event. The touch panel controller 12 further calculates a touch position of the touch event and provides a corresponding coordinate to the microprocessor 14. Accordingly, the microprocessor 14 performs a corresponding operation.

Figures 2A, 2B:
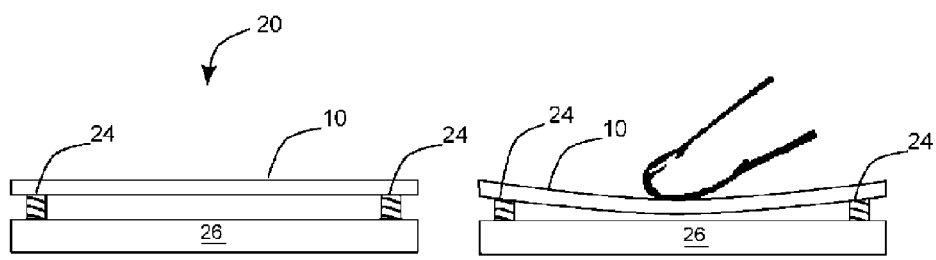
FIG. 2A is a touch screen.
FIG. 2B shows deformation of a touch panel once a touch screen is touched by a finger.

FIG. 2A shows a touch screen 20; FIG. 2B shows deformation of the touch panel 10 when the touch screen 20 receives a finger touch. The touch screen 20 comprises the touch panel 10, an adhesive 24, and a liquid crystal module (LCM) 26. The LCM 26 is for displaying graphics. For example, the adhesive 24 is a double-sided tape for substantially engaging the touch panel 10 on the LCM 26. As a finger touch imposes pressure on the touch screen 20, only the center of the touch panel 10 is caved in to approach the LCM 26 since the periphery of the touch screen 20 is supported by the adhesive 24.

Figure 3:
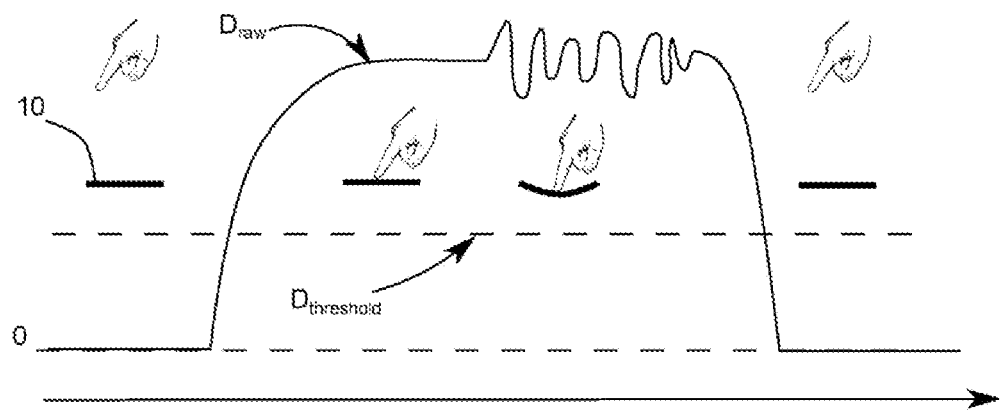
FIG. 3 shows changes in a detection value $D_{raw}$ during a process of a finger touching a touch panel.

FIG. 3 shows changes in a detection value $D_{raw}$ during a process of a finger touching the touch panel 10. With reference to a time axis, from left to right, for a finger from approaching the panel, touching the panel to moving away from the panel, it shows possible self-capacitance changes of the detection value $D_{raw}$ corresponding to a capacitive electrode detected by the touch panel controller 12. Regarding the left most touch panel 10, the self-capacitance of the capacitor electrode 16 on the touch panel 10 remains substantially unchanged, and so the detection value $D_{raw}$ is substantially zero. As the finger approaches and starts touching the touch panel 10, the detection value $D_{raw}$ starts rising. Regarding the second-left touch panel 10, the touch panel controller 10 determines that a touch event occurs once the detection value $D_{raw}$ exceeds a threshold $D_{threshold}$. It should be noted that the touch panel controller 12 may obtain a coordinate of a touch position according to the detection values of several capacitor electrodes 16. Regarding the third-left touch panel 10, when the finger causes deformation of the touch panel 10, the detection value $D_{raw}$ starts drifting, as shown in the diagram. Such drifting may cause deviation between a touch position derived by the touch panel controller 12 and the actual position. Regarding the rightmost touch panel 10, the detection value $D_{raw}$ rapidly drops back to 0 as the finger withdraws from the touch panel 10.

Figure 4:
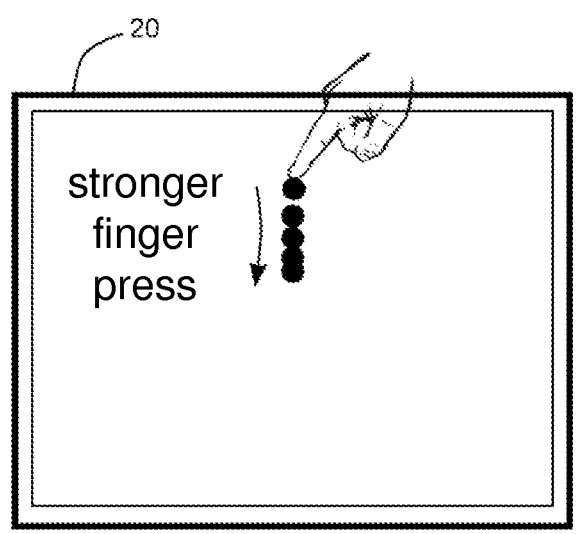
FIG. 4 is an example of a touch position represented by a coordinate derived by a touch panel controller changing as a finger imposes different pressures.

FIG. 4 illustrates the coordinate of the touch position derived by the touch panel controller 12 changes along with different pressures imposed by the finger. Referring to FIG. 4, as the pressure imposed by the finger gets larger, the touch position derived by the touch panel controller 12 shifts towards the center of the touch screen 20, which deviates from the actual touch position. This is due to greater deformation of the touch panel 10 as the pressure imposed by the finger gets larger. Further, the self-capacitance change caused by the deformation gets larger towards the center of the touch screen 20 compared to the outer portion of the touch screen 20. Therefore, as the pressure imposed by the finger gets larger, the touch position derived by the touch panel controller 12 shifts further towards the center of the touch screen 20.

In the following signal processing method according to one embodiment of the disclosure, the self-capacitance changes of the triangular or trapezoidal capacitor electrodes 16 on the touch panel 10 are detected by the touch panel controller 12 in the touch panel system in FIG. 1, and analog detection results are converted to digital detection values $D_{raw}$. Thus, the digital detection values $D_{raw}$ respectively correspond to the self-capacitance changes of the capacitor electrodes 16. In one embodiment, the touch panel 10 is a single-conductive-layer touch panel, which comprises a single transparent conductive layer for forming the capacitor electrodes 16.

In one embodiment, the touch panel 10 comprises a filter structure for low-pass filtering the detection value $D_{raw}$ to generate a filtered value $D_{filtered}$. A coordinate is derived from the filtered values $D_{filtered}$ to represent a touch position of the touch event on the touch panel 10. Through the filter structure of the instant disclosure, the filtered value $D_{filtered}$ stays relatively stable even if the detection value $D_{raw}$ jitters with time due to the deformation of the touch panel 10, and so the touch position derived is also more stable. Further, through the filter structure, for a fast touch-and-release touch event, i.e., for a touch event that a finger only touches the touch panel 10 for an extremely short period, the touch position derived from the filtered value $D_{filtered}$ is much more precise compared to that derived from the detection value $D_{raw}$.

In one embodiment, a beginning period of a touch event is set as a learning period. Within the learning period, an initial condition of the filter structure is set and updated according to a filtered value vector $DA_{filtered}(t_i)$ generated by a current detection value $D_{raw}$. In the learning period, the filtered value $D_{filtered}$ generated by the filter structure having the initial condition that is not yet set is not used for deriving the touch position of the touch event. Only when the learning period is over, the filtered value $D_{filtered}$ generated by the filter structure having the readily set initial condition is used for low-pass filtering to derive the touch position of the touch event, and the touch position is then provided to the microprocessor 14. In one embodiment, the touch position of the touch event derived by the touch panel controller 12 within the learning period is not provided to the microprocessor 14; the touch panel controller 12 provides the touch position of the touch event to the microprocessor 14 after the learning period.

In one embodiment, a filter coefficient of the filter structure changes along with a moving speed of the touch event. For example, the low-pass strength of the filter structure gets "heavier" as the moving speed decreases. Making the strength of the filter "heavier" or "lighter" is described more fully later herein.

Figure 5:
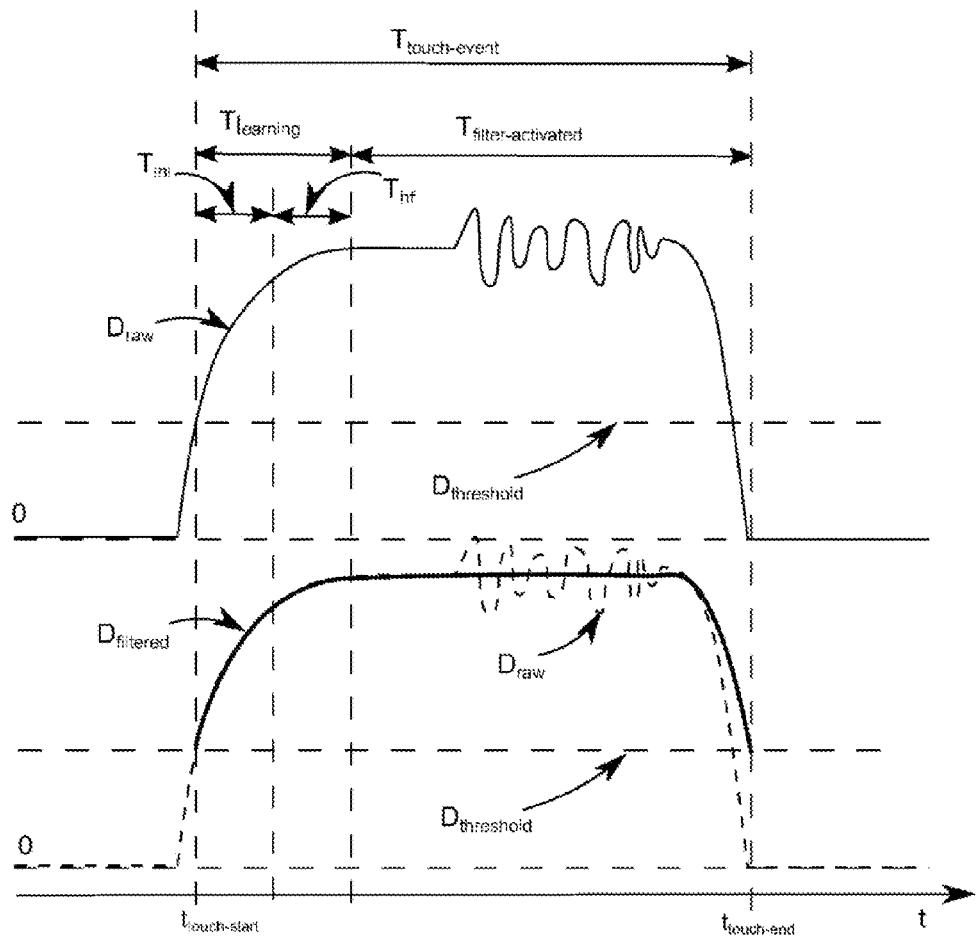
FIG. 5 shows a detection value $D_{raw}$ and a filtered value $D_{filtered}$ generated by a touch panel controller in a process of a finger touching a touch panel according to one embodiment.

FIG. 5 shows the detection value $D_{raw}$ and the filtered value $D_{filtered}$ generated by the touch panel controller in the process of a finger touching the touch panel 10 according to one embodiment. A solid line in an upper part of FIG. 5 is identical to that in FIG. 3, and details thereof are omitted herein. A solid line in a lower part indicates the filtered value $D_{filtered}$, and a dotted line is a duplication of the detected value $D_{raw}$ for comparison. In FIG. 5, the detection value $D_{raw}$ corresponds to only one capacitor electrode 16 of the touch panel 10. It is apparent to a person skilled in the art that the touch panel controller 12 can generate at the same time many different detection values $D_{raw}$, respectively corresponding to the capacitor electrodes 16 of the touch panel 10. Therefore, the description associated with FIG. 5 may also be applied to other capacitor electrodes 16.

In FIG. 5, a touch period $T_{touch-event}$ of the touch event is divided into two parts—a learning period $T_{learning}$ and a subsequent filter activated period $T_{filter-activated}$. The learning period $T_{learning}$ is further divided into two parts—an initial period $T_{ini}$ and a subsequent stable period $T_{hf}$.

At a time point $t_{touch-start}$, the detection value $D_{raw}$ exceeds a threshold $D_{threshold}$, such that the touch panel controller 12 determines that a touch event occurs, and launches the entire touch period $T_{touch-event}$.

After the touch period $T_{touch-event}$ is launched, in the front-part initial period $T_{ini}$, the predetermined detection value $D_{raw}$ exceeds the threshold $D_{threshold}$ and is still rising. At this point, the detection value $D_{raw}$ is at a transient state and has not yet reached a stable state. Meanwhile, the filter structure is not yet activated by the touch panel system of the disclosure, and the detection value $D_{raw}$ is directly used as the filtered value $D_{filtered}$.

As the predetermined initial period $T_{ini}$ ends and the predetermined stable period $T_{hf}$ begins, the filter structure is activated by the touch panel system of the disclosure to generate the current detection value $D_{filtered}$ according to the previous filtered value $D_{filtered}$ and the current detection value $D_{raw}$. However, the filtered value $D_{filtered}$ at this point is still not used for deriving the touch position of the touch event.

After the predetermined stable period $T_{hf}$ in the subsequent filter activated period $T_{filter-activated}$, the previous filtered value $D_{filtered}$ and the current detection value $D_{raw}$ are employed to generate the current filtered value $D_{filtered}$, which is used for deriving the touch position of the touch event. In one embodiment, a change of the touch position of the touch event with respect to time is approximately associated with a current moving speed of the touch position of the touch event, which therefore serves as a reference for the subsequent filter structure and the low-pass strength. Details will be given in descriptions of FIG. 8.

In one embodiment, when the filtered value $D_{filtered}$ drops to lower than the threshold $D_{threshold}$, the touch panel controller 12 determines that the touch event ends, and thus ends the touch period $T_{touch-event}$, as shown by a time point $t_{touch-end}$ in FIG. 5.

It is learned from the above descriptions that, the filtered value $D_{filtered}$ in the filter structure takes effect on the derivation for the touch position starting from the filter activated period $T_{filter-activated}$. Within the filter activated period $T_{filter-activated}$, an initial value of the filtered value $D_{filtered}$ is determined in the learning period $T_{learning}$. The learning period $T_{learning}$ serves as a period for setting the initial value of the filtered value $D_{filtered}$ within the filter activated period $T_{filter-activated}$.

By comparing curves of the detection value $D_{raw}$ and the filtered value $D_{filtered}$ in FIG. 5, it is also known that, in the filter activated period $T_{filter-activated}$, the touch position of the touch event derived by the touch panel controller 12 is less disturbed and more smooth than that derived according to the detection value $D_{raw}$ before the filtering.

Figure 6:
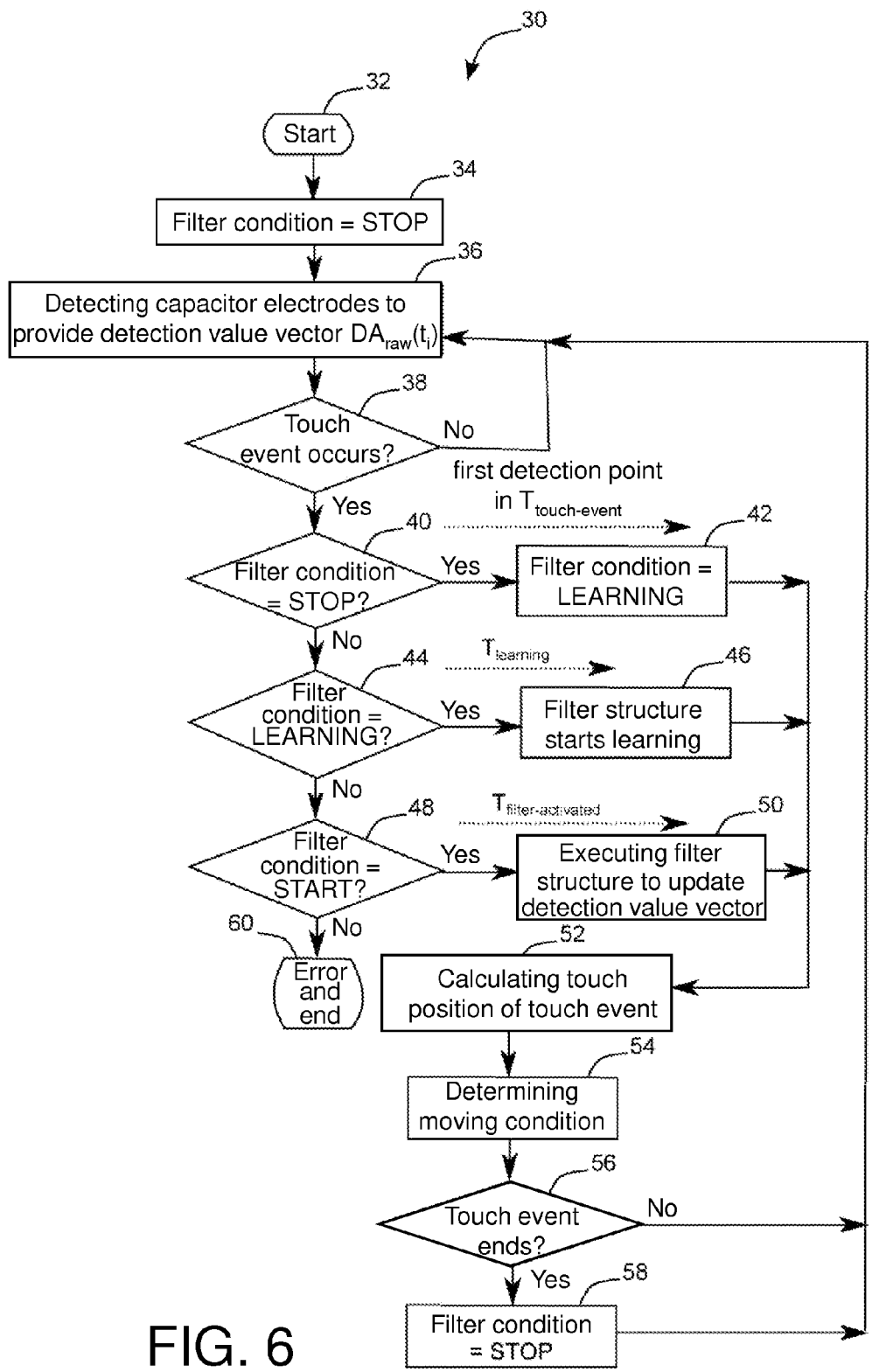
FIG. 6 illustrates a signal processing method applied to the touch panel controller in FIG. 1 according to one embodiment of the disclosure.

FIG. 6 shows a signal processing method 30 applied to the touch panel controller 12 in FIG. 1 according to one embodiment of the disclosure.

The signal processing method 30 begins with Step S32. In Step 34, a filter condition is set to "STOP" to indicate that a filter structure in the touch panel controller 12 is inactivated and ineffective. The filter structure in this embodiment accomplishes the target of the disclosure through Equation (I).

$$DA_{filtered}(t_i) = a * DA_{filtered}(t_{i-1}) + (1-a) * DA_{raw}(t_i) \quad \text{Equation (I)}$$

Where $D_{raw}(t_i)$ represents a detection value vector formed by several detection values $D_{raw}$ generated by the touch panel controller 12 at a detection time point $t_i$, $DA_{filtered}(t_{i-1})$ represents a filtered value vector formed by several filtered values $D_{filtered}$ at a previous detection time point $t_{i-1}$, $DA_{filtered}(t_i)$ represents another filtered value vector formed by several filtered values $D_{filtered}$ at this current detection time point $t_i$, and a is a filter coefficient having a value ranging between 0 and 1. The low-pass filter strength gets lighter as the value of a decreases. For example, when a is 0, the filtered value vector $DA_{filtered}(t_i)$ equals the detection value vector $DA_{raw}(t_i)$, which means no filter strength is provided. In other embodiments, the filter structure may execute other equations apart from Equation (I), given that the filtered value vector $DA_{filtered}(t_i)$ is a filtered resulted of low-pass filtering the detection value vector $DA_{raw}(t_i)$.

In Step 36, the capacitor electrodes 16 are detected to provide the detection value vector $DA_{raw}(t_i)$. The detection values $D_{raw}$ in the $DA_{raw}(t_i)$ respectively correspond to the self-capacitance changes of one capacitor electrodes 16.

In Step 38, it is determined whether a touch event occurs according to the detection value vector $DA_{raw}(t_i)$. For example, when any of the detection values $D_{raw}$ exceeds the threshold $D_{threshold}$, it is determined in Step 38 that a touch event occurs, and Step 40 is performed to launch the touch period $T_{touch-event}$. When no detection value $D_{raw}$ exceeds the threshold $D_{threshold}$, it is determined in Step 38 that no touch event occurs, and Step 36 is iterated to generate the detection value vector $DA_{raw}(t_{i+1})$ of the next detection time point.

Referring to FIG. 5 and FIG. 6, in Step 40, 44 and 48, it is identified which time point the current time point is in the touch period $T_{touch-event}$ according to the filter condition. When the filter condition is "STOP", it means the current time point is a first detection time point in the touch period $T_{touch-event}$, and so Step 42 is performed to set the filter condition to "LEARNING" for getting ready to enter the learning period $T_{learning}$. When the filter condition is "LEARNING", it means the current time point is in the learning period $T_{learning}$, and so Step 46 is performed to implement the filter structure for learning and to generate the filtered value vector $DA_{filtered}(t_i)$ as the initial value of the filter activated period $T_{filter-activated}$. When the predetermined learning period $T_{learning}$ ends, the filter condition is set to "START". Step 46 will be detailed later. When the filter condition is "START", it means the current time point is in the filter activated period $T_{filter-activated}$, and Step 50 is performed to execute Equation (I) to generate the filtered value vector $DA_{filtered}(t_i)$ and to update the detection value vector $DA_{raw}(t_i)$ to equal to the filtered value vector $DA_{filtered}(t_i)$. When the filter condition is not any of the predetermined "STOP", "LEARNING", or "START", it is determined in Step 60 that an error occurs, and the flow of the signal processing method 30 ends.

In Step 52, a coordinate $(x(t_i), y(t_i))$ is estimated according to the detection value vector $DA_{raw}(t_i)$ to represent the touch position of the touch event on the touch panel. The coordinate $(x(t_i), y(t_i))$ may be outputted by the touch panel controller 12 to the microprocessor 14. In Step 54, the current moving condition, e.g., a moving speed of the current touch position, may be set according to the current coordinate $(x(t_i), y(t_i))$ and a previous coordinate $(x(t_{i-1}), y(t_{i-1}))$. Meanwhile, the filter coefficient may also be accordingly set to change the filter strength of the filter structure.

In Step 56, it is identified whether the touch event ends. Similarly, if any of the detection value $D_{raw}$ in the detection value vector $DA_{raw}(t_i)$ exceeds the threshold $D_{threshold}$, it is determined that the touch event is still taking place and the process returns to Step 36. When no detection value $D_{raw}$ exceeds the threshold $D_{threshold}$, it is determined in Step 56 that the touch event ends, and Step 58 is performed to set the filter condition to "STOP", followed by returning to Step 36.

It is known from the signal processing method 30 that the detection value vector $DA_{raw}(t_i)$ is not updated in Steps 42 and 46. That is to say, the derivation for the coordinate $(x(t_i), y(t_i))$ in Step 52 in this period is based on the original detection value vector $DA_{raw}(t_i)$. Only when the detection value vector $DA_{raw}(t_i)$ is updated according to the filtered value vector $DA_{filtered}(t_i)$ in Step 50, is the derivation for the coordinate $(x(t_i), y(t_i))$ in Step 52 based on the updated detection value vector $DA_{raw}(t_i)$. Since the $DA_{raw}(t_i)$ is updated according to the filtered value vector $DA_{filtered}(t_i)$ in Step 50, the coordinate $(x(t_i), y(t_i))$ derived in Step 52 is low-pass filtered and is thus resistant against drifting.

Moreover, in the filter activated period $T_{filter-activated}$, the detection value vector $DA_{raw}(t_i)$ is updated to equal to the filtered value vector $DA_{filtered}(t_i)$ in Step 50, and so Step 56 is in equivalence identifying whether the touch event ends according to the filtered value vector $DA_{filtered}(t_i)$.

Figure 7:
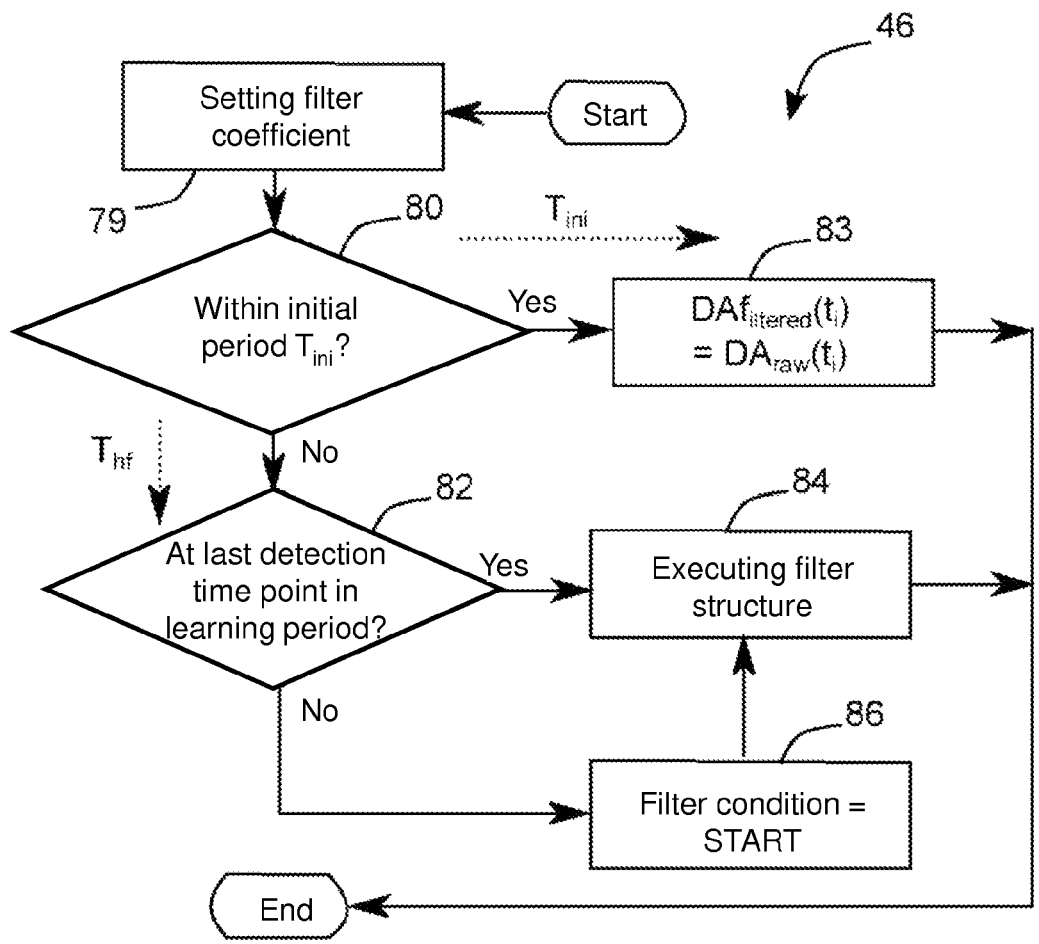
FIG. 7 is an example for explaining Step 46 in FIG. 6.

FIG. 7 shows an example of Step 46 in FIG. 6 performed in the learning period $T_{learning}$. In Step 79, the filter coefficient is set to a larger value, e.g., 0.8. This implies that if the filter structure is executed in the learning period $T_{learning}$, a heavy filter is executed. In one embodiment, the learning period $T_{learning}$ is 40 detection time points after the touch event begins.

In Step 80, it is determined whether the current state is within the predetermined initial period $T_{ini}$. For example, a determination result of Step 80 is affirmative when it is within 10 detection time points after the touch event begins, and Step 83 is performed to directly utilize the detection value vector $DA_{raw}(t_i)$ as the filtered value vector $DA_{filtered}(t_i)$. When it is within 11 to 40 detection time points after the touch event begins, it means that it falls within the predetermined stable period $T_{hf}$, and so Step 82 is performed to determine whether it is at the last detection time point in the learning period $T_{learning}$. Regardless of the result in Step 82, the filter structure in Equation (I) is executed in Step 84 to generate the current filtered value vector $DA_{filtered}(t_i)$ according to the previous filtered value vector $DA_{filtered}(t_{i-1})$ and the current detection value $DA_{raw}(t_i)$ by heavy-filtering. When it is determined in Step 82 that it is at the last detection time point in the learning period $T_{learning}$, the filter condition is set to "START" in Step 86, such that the process enters Step 50 in FIG. 6 at the next detection time point. Furthermore, the filtered value vector $DA_{filtered}(t_i)$ generated in Step 84 right after the filter condition set to "START" in Step 86 is set as the initial condition of the filter structure, to complete setting the initial condition of the filter structure in the learning period $T_{learning}$.

Figure 8:
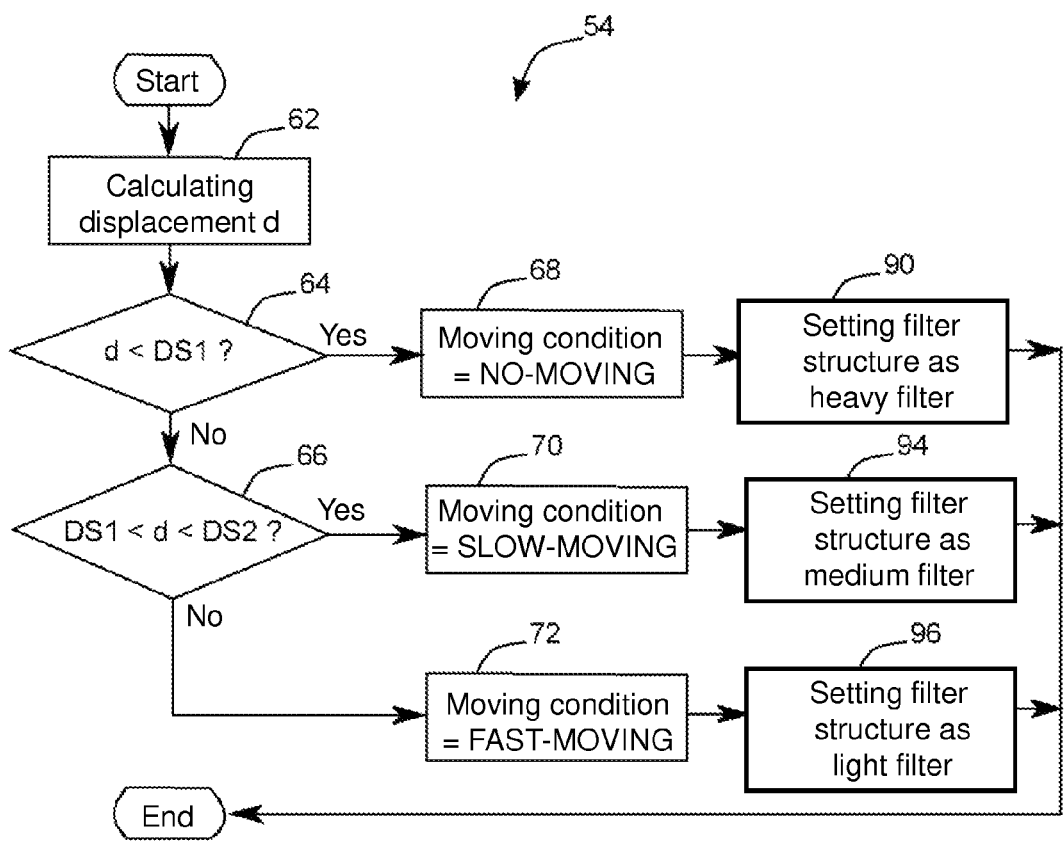
FIG. 8 is an example for explaining Step 54 in FIG. 6.

FIG. 8 is an embodiment of Step 54 in FIG. 6. In Step 62, a displacement 'd' between the current coordinate and the previous coordinate is calculated. For example, $d=sqrt((x(t_i)-x(t_{i-1}))^2+(y(t_i)-y(t_{i-1}))^2)$, where sqrt( ) is a square root. Steps 64 and 66 are for identifying within which range the current displacement d falls. When the displacement d is smaller than a predetermined value DS1, it means the moving speed of the current touch position approximates 0, and the moving condition is set to "NO-MOVING" in Step 68, and the filter coefficient a is set to a larger value, e.g., 0.8, in Step 90. At this point, the filter structure is a heavy filter. When the displacement d is between the values DS1 and DS2, the moving condition is set to "SLOW-MOVING" in Step 70, and the filter coefficient is set to an intermediate value, e.g., 0.5, in Step 94. At this point, the filter structure is a medium filter. When the displacement d is greater than the predetermined value DS2, the moving condition is set to "FAST-MOVING" in Step 72, and the filter coefficient a is set to a smaller value, e.g., 0.1, in Step 96. At this point, the filter structure is a light filter. In other words, when a moving speed of the touch position of the touch event is very slow, a heavy filter structure is implemented in Step 50 in FIG. 6 to generate the filtered value vector $DA_{filtered}(t_i)$ as well as to accordingly update the detection value vector $DA_{raw}(t_i)$ and calculate the subsequent touch position of the touch event. Therefore, the derived touch position is more stable and unaffected by deformation disturbances of the touch panel 10. Conversely, when the moving speed of the touch position is fast, a light filter structure is implemented in Step 50 in FIG. 6 to generate the filtered value $DA_{filtered}(t_i)$ and to accordingly calculate the subsequent touch position of the touch event. Therefore, the derived position may closely follow the actual touch position of the touch event to reflect the truth.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing method adapted for a touch panel, the touch panel comprising a plurality of capacitor electrodes, the method comprising:
   providing a plurality of detection values respectively corresponding to a plurality of capacitance changes of the capacitor electrodes;
   low-pass filtering the detection values according to a filter structure to generate a plurality of filtered values, the filter structure being associated with a characteristic of a touch event;
   determining a touch position on the touch panel of the touch event according to one of the filtered values and the detection values;
   determining a displacement according to the touch position, the displacement being the characteristic of the touch event,
   wherein:
   when the displacement is greater than a first distance, the filter structure is set to a first filter structure;
   when the displacement is between the first distance and a second distance, the filter structure is set to a second filter structure;
   when the displacement is smaller than the second distance, the filter structure is set to a third filter structure;
   the first distance is greater than the second distance; and
   filter strengths of the first filter structure, the second filter structure and the third filter structure are associated with the first distance and the second distance, such that the filter strength of the third filter structure is heavier than that of the second filter structure, and the filter strength of the second filter structure is heavier than that of the first filter structure.

2. The method according to claim 1, further comprising:
   determining whether the touch event occurs according to the detection values; and
   setting a learning period after the touch event occurs, and not determining the touch position according to the detection values in the learning period.

3. The method according to claim 2, comprising:
   low-pass filtering the detection values according to the filter structure to generate the filtered values in a stable period within the learning period; wherein, when the learning period ends, the filtered values are taken as a plurality of filter initial values for setting the filter structure.

4. The method according to claim 2, comprising:
   utilizing the detection values as the filtered values in an initial period within the learning period.

5. The method according to claim 2, further comprising:
   outputting the touch position to a microprocessor after the learning period; and
   not outputting the touch position to a microprocessor in the learning period.

6. The method according to claim 1, further comprising:
   determining whether the touch event ends according to the filtered values.

7. The method according to claim 1, wherein the detection values correspond to self-capacitance changes of the capacitor electrodes.

8. The method according to claim 1, wherein the touch panel is a single-conductive-layer touch panel.

9. A touch panel system, comprising:
   a touch panel, comprising a plurality of capacitor electrodes; and
   a touch panel controller, coupled to the capacitor electrodes, for detecting the capacitor electrodes to generate a plurality of corresponding detection values;
   wherein, the touch panel controller low-pass filters the detection values according to a filter structure to generate a plurality of filtered values, the filter structure is associated with a characteristic of a touch event, and a touch position on the touch panel of the touch event is determined according to the filtered values or the detection values,
   wherein the touch panel controller determines a displacement according to the touch position, and the displacement is the characteristic of the touch event,
   wherein:
   when the displacement is greater than a first distance, the touch panel controller low-pass filters the detection values using a first filter structure;

when the displacement is between the first distance and a second distance, the touch panel controller low-pass filters the detection values using a second filter structure;

when the displacement is smaller than the second distance, the touch panel controller low-pass filters the detection values using a third filter structure;

the first distance is greater than the second distance; and filter strengths of the first filter structure, the second filter structure and the third filter structure are associated with the first distance and the second distance, such that the filter strength of the third filter structure is heavier than that of the second filter structure, and the filter strength of the second filter structure is heavier than that of the first filter structure.

10. The touch panel system according to claim 9, wherein the touch panel controller determines whether the touch event occurs according to the detection values, and does not determine the touch position according to the detection values in a learning period after the touch event occurs.

11. The touch panel system according to claim 10, wherein the touch panel controller low-pass filters the detection values to generate the filtered values according to the filter structure in a stable period within the learning period; and when the learning period ends the filtered values are taken as a plurality of filter initial values for setting the filter structure.

12. The touch panel system according to claim 10, wherein the touch panel controller utilizes the detection values as the filtered values in an initial period within the learning period.

13. The touch panel system according to claim 9, wherein the detection values correspond to self-capacitance changes of the capacitor electrodes.

14. The touch panel system according to claim 9, wherein the touch panel is a single-conductive-layer touch panel.

* * * * *